US010853250B2

(12) United States Patent
Xu et al.

(10) Patent No.: US 10,853,250 B2
(45) Date of Patent: Dec. 1, 2020

(54) STORAGE MANAGEMENT METHOD, ELECTRONIC DEVICE AND COMPUTER PROGRAM PRODUCT

(71) Applicant: EMC IP Holding Company LLC, Hopkinton, MA (US)

(72) Inventors: Xinlei Xu, Beijing (CN); Ruiyong Jia, Beijing (CN); Changyu Feng, Beijing (CN); Jian Gao, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/294,330

(22) Filed: Mar. 6, 2019

(65) Prior Publication Data

US 2019/0332531 A1  Oct. 31, 2019

(30) Foreign Application Priority Data

Apr. 28, 2018  (CN) .......................... 2018 1 0399418

(51) Int. Cl.
*G06F 12/08* (2016.01)
*G06F 12/0804* (2016.01)

(52) U.S. Cl.
CPC .. *G06F 12/0804* (2013.01); *G06F 2212/1032* (2013.01); *G06F 2212/608* (2013.01)

(58) Field of Classification Search
CPC .................................................. G06F 12/0804
See application file for complete search history.

(56) References Cited

U.S. PATENT DOCUMENTS

| 7,475,207 B2 | 1/2009 | Bromling et al. |
| 8,661,068 B1 | 2/2014 | Seibel et al. |
| 9,135,123 B1 | 9/2015 | Armangau et al. |
| 9,229,870 B1 * | 1/2016 | Kumar .................... G06F 11/34 |
| 9,645,932 B1 | 5/2017 | Bono et al. |
| 9,710,383 B1 * | 7/2017 | Xu ....................... G06F 12/0246 |
| 9,767,021 B1 * | 9/2017 | Wu ....................... G06F 12/126 |
| 9,817,766 B1 | 11/2017 | Si et al. |
| 9,880,764 B1 * | 1/2018 | Xu ....................... G06F 12/0873 |
| 10,127,156 B1 * | 11/2018 | Yan ..................... G06F 12/0868 |
| 10,402,096 B2 | 9/2019 | Sen et al. |
| 10,620,850 B1 | 4/2020 | Xu et al. |
| 2004/0044845 A1 * | 3/2004 | Gibble .................. G06F 3/0686 |
| | | 711/112 |

(Continued)

*Primary Examiner* — Ryan Bertram
(74) *Attorney, Agent, or Firm* — BainwoodHuang

(57) ABSTRACT

Techniques provide a storage management mechanism for flushing a page out of cache. The techniques involve obtaining recently used (RU) information of cache. The cache includes volumes, each of which includes a plurality of pages. The RU information indicates at least part of the volumes, and an unaccessed time length of pages in the at least part of the volumes exceeds a threshold time length. The techniques further involve: determining, based on a total number of pages to be flushed out of the cache and the RU information, a number of pages to be flushed out of the cache from the at least part of the volumes. The techniques further involve flushing, based on the determined number, pages in the at least part of the volumes. Accordingly, cache efficiency can be increased, and the overall performance of the disk array can be increased accordingly.

22 Claims, 11 Drawing Sheets

(56) References Cited

U.S. PATENT DOCUMENTS

| | | | | |
|---|---|---|---|---|
| 2005/0055512 | A1* | 3/2005 | Kishi | G06F 3/0647 |
| | | | | 711/135 |
| 2006/0143399 | A1* | 6/2006 | Petev | G06F 12/123 |
| | | | | 711/136 |
| 2006/0265568 | A1* | 11/2006 | Burton | G06F 12/0862 |
| | | | | 711/216 |
| 2010/0199042 | A1* | 8/2010 | Bates | G06F 11/2064 |
| | | | | 711/114 |
| 2011/0191522 | A1* | 8/2011 | Condict | G06F 12/123 |
| | | | | 711/103 |
| 2013/0151786 | A1* | 6/2013 | Huras | G06F 12/0888 |
| | | | | 711/135 |
| 2013/0282982 | A1* | 10/2013 | Hayashi | G06F 3/0685 |
| | | | | 711/118 |
| 2014/0068209 | A1* | 3/2014 | Lim | G06F 12/08 |
| | | | | 711/162 |
| 2014/0108759 | A1* | 4/2014 | Iwamitsu | G06F 3/0604 |
| | | | | 711/165 |
| 2014/0331007 | A1* | 11/2014 | Sasaki | G06F 3/061 |
| | | | | 711/113 |
| 2015/0277773 | A1* | 10/2015 | Shen | G06F 3/0649 |
| | | | | 711/114 |
| 2015/0293856 | A1* | 10/2015 | Zhang | G06F 12/0868 |
| | | | | 711/114 |
| 2016/0253265 | A1* | 9/2016 | Rapoport | G06F 3/061 |
| | | | | 711/135 |
| 2017/0103020 | A1* | 4/2017 | Xu | G06F 12/0895 |
| 2018/0150125 | A1* | 5/2018 | HomChaudhuri | G06F 12/1009 |
| 2020/0089624 | A1* | 3/2020 | Puttaswamy Naga | |
| | | | | G06F 3/0652 |

\* cited by examiner

STORAGE MANAGEMENT METHOD, ELECTRONIC DEVICE AND COMPUTER PROGRAM PRODUCT

CROSS-REFERENCE TO RELATED APPLICATION(S)

This application claims priority to Chinese Patent Application No. CN201810399418.2, on file at the China National Intellectual Property Administration (CNIPA), having a filing date of Apr. 28, 2018, and having "STORAGE MANAGEMENT METHOD, ELECTRONIC DEVICE AND COMPUTER PROGRAM PRODUCT" as a title, the contents and teachings of which are herein incorporated by reference in their entirety.

FIELD

The present disclosure generally relates to field of data storage, and more specifically, the present disclosure relates to a storage management method, an electronic device and a computer program product of flushing a page out of a cache.

BACKGROUND

With development of data storage technologies, various kinds of data storage devices can be provided to a user with more and more powerful data storage capability, and the speed of data access is accelerated remarkably. At present, a technical solution of a storage system based on a multi-level storage medium and having different access speeds has been developed. For example, data used frequently can be loaded from a storage device with a low access speed to a cache device with a high access speed, so that the cache device is used to respond to an access request from outside of the storage system, thereby improving efficiency of a responding of the data to a certain extent.

Generally, a first layer cache can be a dynamic random access memory (DRAM) cache; and a second layer cache can be a solid state drive (SSD) cache, a non-volatile memory express (NVMe) cache and a non-volatile dual in-line memory module (NVDIMM) cache. When the number of pages cached in the cache exceeds a certain threshold level, it is required to remove some pages from the cache, that is, these pages are flushed out of the cache. A page replacement algorithm for determining which pages are to be flushed affects a hit rate of cached pages, thus influencing efficiency of responding of the data.

SUMMARY

Embodiments of the present disclosure provide a solution for flushing pages out of a cache.

In accordance with a first aspect of the present disclosure, there is provided a storage management method. The method includes obtaining recently used (RU) information of a cache. The cache includes volumes, each of which includes a plurality of pages. The RU information indicates at least part of the volumes, and an unaccessed time length of pages in the at least part of the volumes exceeds a threshold time length. The method also includes determining, based on a total number of pages of the cache to be flushed and the RU information, a number of pages to be flushed out of the cache from the at least part of the volumes. The method further includes flushing, based on the determined number, pages in the at least part of the volumes.

In accordance with a second aspect of the present disclosure, there is provided an electronic device. The electronic device includes a processor and a memory coupled to the processor and storing instructions therein, and the instructions, when executed by the processor, causing the device to execute acts. The acts include obtaining recently used (RU) information of a cache. The cache includes volumes, each of which includes a plurality of pages. The RU information indicates at least part of the volumes, and an unaccessed time length of pages in the at least part of the volumes exceeds a threshold time length. The acts also include, based on a total number of pages of the cache to be flushed and the RU information, a number of pages to be flushed out of the cache from the at least part of the volumes. The acts further include flushing, based on the determined number, pages in the at least part of the volumes.

In accordance with a third aspect of the present disclosure, there is provided a computer program product, which is stored tangibly on a computer readable medium and includes machine executable instructions, and the machine executable instructions, when executed, causes a machine to perform the method in accordance with the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent through the detailed description on example embodiments of the present disclosure with reference to the accompanying drawings, wherein the same reference symbols generally represent the same components. In the drawings.

DETAILED DESCRIPTION OF EMBODIMENTS

Figure 1:
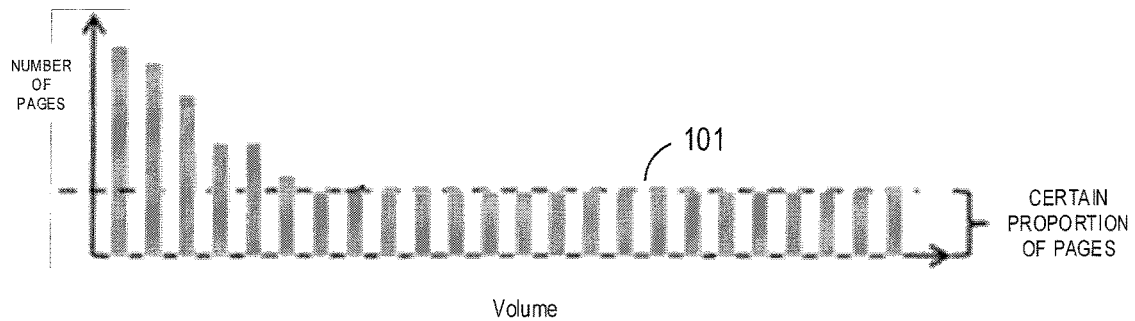
FIG. 1 illustrates a brief diagram of a page flush implementation in the conventional solution.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will be described below with reference to several examples illustrated in the drawings. Although the drawings illustrate preferred embodiments of the present disclosure, it would be understood that description of these embodiments is merely to enable those skilled in the art to better understand and further implement example embodiments disclosed herein and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one another embodiment." The terms "first", "second" and so on can refer to same or different objects. The following text can also include other explicit and implicit definitions.

In a second layer cache, such as a SSD cache, a current page replacement policy is based on a least recently used (LRU) algorithm and implements a LRU list per volume. The cached pages of each volume are linked as a LRU list. A global shadow list (which is referred to as a history list hereinafter) is used to manage hit missed pages. The most recently accessed page is located at a tail of the LRU list, while the longest unaccessed page is located at a head.

When cached pages in the cache reach a high threshold level, a cleaner thread begins to perform an idle flush. The process of flushing is circulated for each volume, so as to select a page from the head of the LRU list and evict the page out of the cache. FIG. 1 illustrates a brief diagram of page flush implementation in the conventional solution. In the implementation, a certain proportion of pages which will not be flushed are reserved for each volume, and the proportion (for example 50%) is marked as MIN_PAGES, as shown by a dotted line 101 in FIG. 1. If the number of pages cached in a certain volume is below MIN_PAGES, the volume will not be considered during a page flush. This policy can ensure fairness among volumes.

Figure 2:
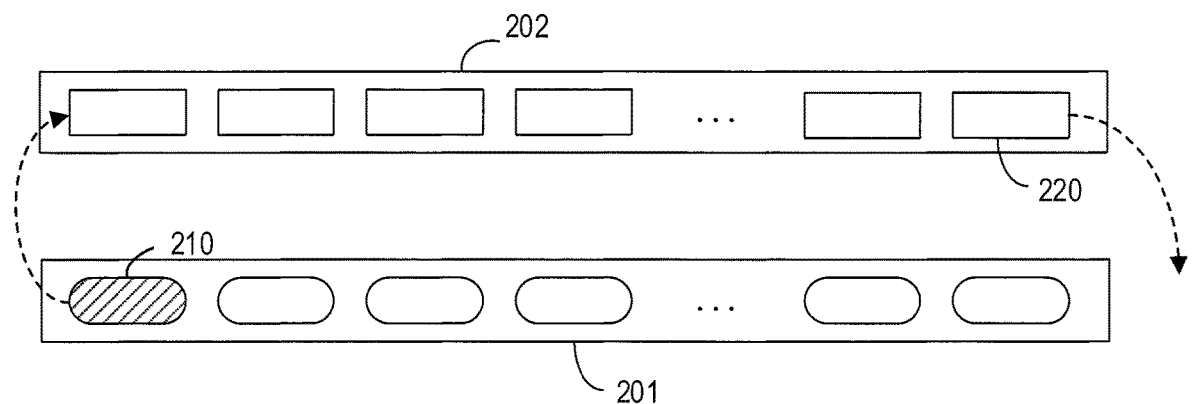
FIG. 2 illustrates an example of squeezing a high frequency page out of the cache by a low frequency page in the conventional solution.

However, inventors have realized several problems in the implementation. First, a high frequency page may be squeezed out of the cache. The LRU algorithm only orders the pages based on a recently accessed time of the pages, but does not collect information on an access frequency of a page, and the access frequency of the page cannot affect its location in the LRU list. Therefore, such kind of algorithm may result in a problem that a temporarily hot page squeezes a high frequency page out of the cache. FIG. 2 illustrates an example of squeezing a high frequency page out of the cache by a low frequency page in the conventional solution. In the example, a page 220 in a LRU list 202 is accessed 10 times within an hour, while a page 210 in a history list 201 is accessed 3 times within an hour. Due to the defect of the LRU algorithm, the page 220 is flushed out of the cache, and the page 210 is cached in the cache and information of the page 210 is added to the LRU list 202.

Second, stale pages may restrict available pages of a system. Typically, cache resources in a storage system are limited. The LRU algorithm does not collect page access frequency information, so as to prevent an extremely hot volume occupying too many cache resources from squeezing out interval hot pages of other volumes and to avoid unfairness for the interval hot pages. As such, MIN_PAGES as described above is provided for each volume. The MIN_PAGES ensures fairness, but also brings problems of stale pages to the cache. Some volumes become hot and cache some pages, and these volumes probably become completely cold, subsequently. Due to the presence of MIN_PAAGES, pages in these volumes will not be evicted out of the cache, thereby causing a waste of the cache resources.

Another problem lies in that there is no global LRU in the entire cache. The cached pages are maintained according to a logic unit number (LUN). When flushing a page, a cleaner thread circulates a LRU list of each volume and flushes a same number of pages from each volume. As a result, even though cached pages are very hot, they may still be evicted out of the cache if their LRU lists are short.

In addition, there is no relevance between the shadow pages and the cached pages. In a current implementation, the shadow pages and the cached pages are saved in different lists. When the cache records an access frequency of the shadow pages, the cache does not care about states of the cached pages. Hence, even though a shadow page has not been accessed for a long time, its history access frequency is still regard as valid, and these pages can be promoted based on some stale historical hits. Such promotion may evict some hot pages out of the cache, which is undesirable.

Moreover, if a page is flushed, its historical information is completely lost. However, as a matter of fact, if the most recently accessed time of the page is newer than the most recently accessed time of the history list, the history record of the page should be considered as useful and be reserved in the history list.

The present disclosure provides a solution for flushing pages out of a cache, to at least alleviate one or more of the foregoing defects. In this solution, a page flushing algorithm among volumes based on page access time is implemented, which can ensure fairness among volumes and solve the problem of stale pages for cold volumes. In this solution, a page replacement algorithm among pages in a volume based on access time and access frequency is implemented, and information on access frequency of the flushed pages is saved. Therefore, the solution can ensure that the hottest page will not be squeezed out of the cache by pages that are not so hot, due to an input/output (I/O) pattern. The solution can also bring benefits, including: the high frequency pages are saved longer than the low frequency pages; the using frequency and efficiency of the cache are increased such that an overall performance of a disk array can be improved; and newly cached pages will be more valuable than the flushed pages. Additionally, the solution is applicable to any cache device with the foregoing problems, including, but not limited to, a SSD cache, an NVMe cache and a NVDIMM cache.

In embodiments of the present disclosure, the pages are divided into shadow pages, idle pages and cached pages. The shadow pages are not saved in the cache but only represent references for a certain range of I/O accesses. Idle pages are pages in the cache which have not been used for any user data yet. Cached pages indicate user data saved in the cache.

Figure 3:
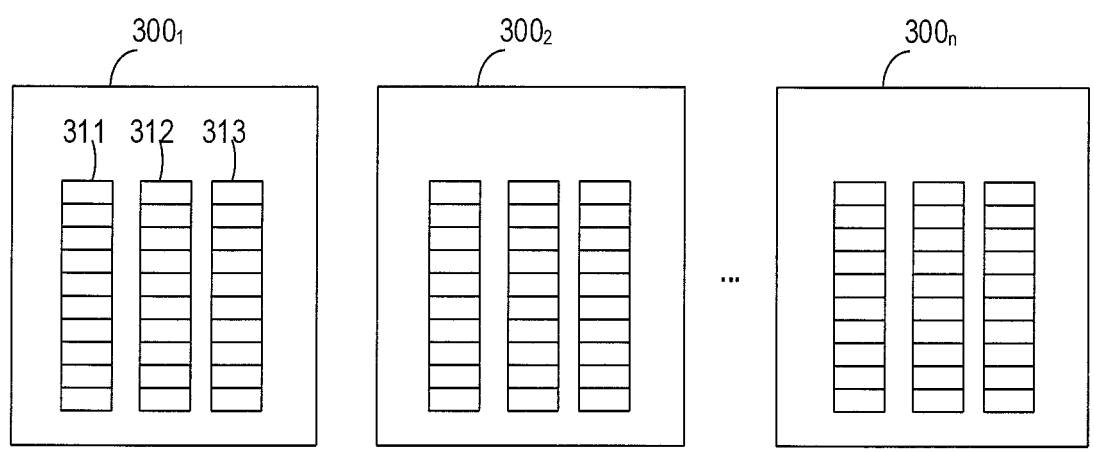
FIG. 3 illustrates a diagram of a volume structure for managing cached pages according to embodiments of the present disclosure.

FIG. 3 illustrates a schematic diagram of a volume structure for managing cached pages according to embodiments of the present disclosure. As shown in FIG. 3, each logic unit number (LUN) of cache has a volume structure to manage the cached pages for that LUN. Each volume includes a plurality of cached pages. These cached pages can be divided into one or more groups. In some embodiments, a plurality of cached pages can be organized into one or more queues, and the cached pages can be ordered within the queues based on recently accessed time. FIG. 3 illustrates volumes $300_1$, $300_2$ and $300_n$. Taking the volume $300_1$ for example, the cached pages are organized into three queues 311, 321 and 313. It is to be noted that, although FIG. 3 illustrates that each volume has three queues, this is provided as an example without intention to make any limitation. In some embodiments, each volume can only have one queue, for example one LRU list. In some embodiments, some volumes can have one queue, while some other volumes can have a plurality of queues.

Each volume can include a parameter, such as an unaccessed time length (e.g., a numerical measure or value). In some cases, each volume can be associated with a timer. The timer associated with the volume can determine a longest unaccessed page and an unaccessed time length for the volume at a certain interval, and records the unaccessed time length. The longest unaccessed page indicates the page that has not been accessed for the longest time among the cached pages of the volume. In some cases, each volume may not have a timer associated therewith. In this case, the unaccessed time length for this volume can remain unchanged.

In some embodiments, the longest unaccessed page and the unaccessed time length can be based on an actual unaccessed time length of the cached pages. In some embodiments, the longest unaccessed page and the unaccessed time length can also be based on a weight of an actual unaccessed time length and an access frequency of the cached pages (see descriptions below with respect to the FIG. 9).

Figure 4:
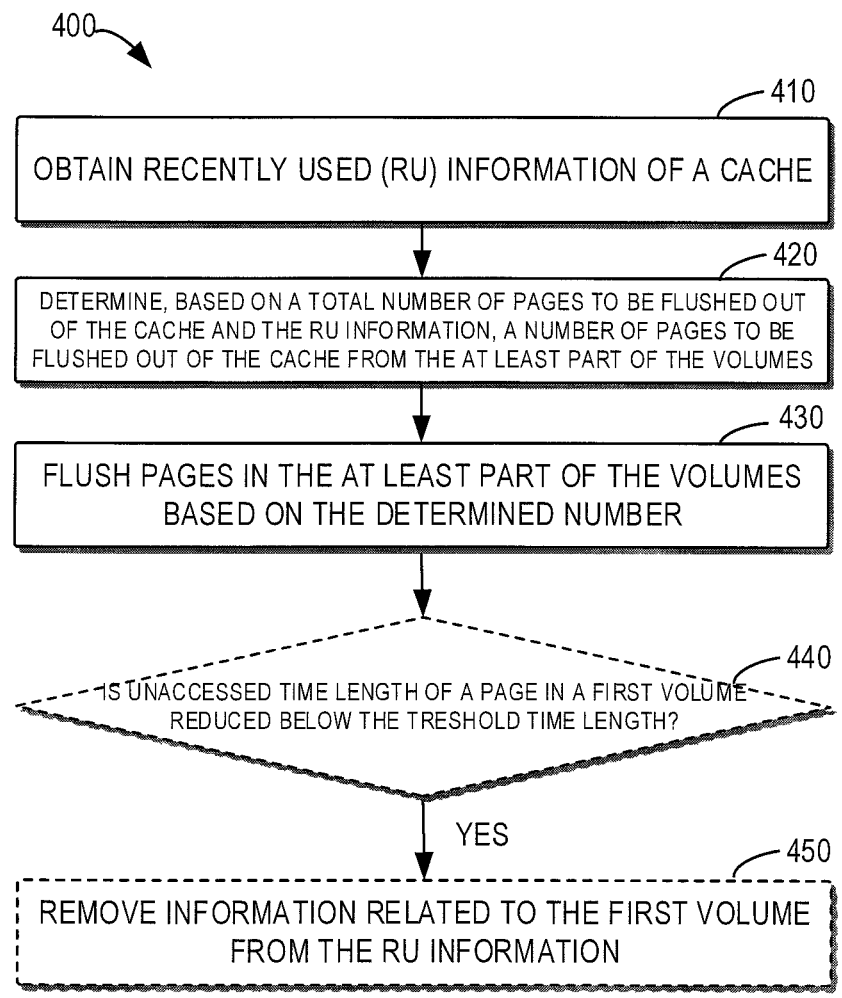
FIG. 4 illustrates a flowchart of a process of flushing cached pages according to embodiments of the present disclosure.
Figure 5:
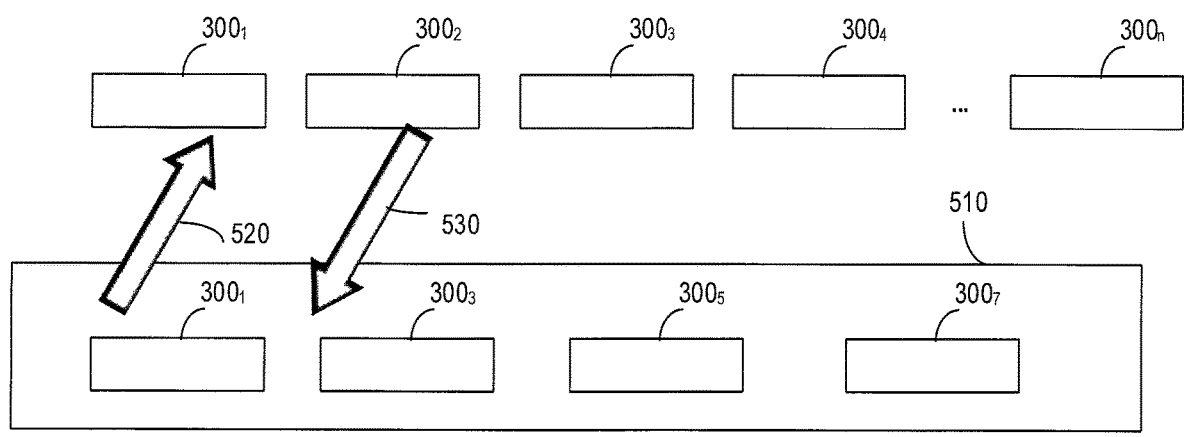
FIG. 5 depicts a schematic diagram of adding and removing information related to at least part of volumes to and from recently used information.

A process of flushing a cached page from a cache will be described below with reference to FIGS. 4 and 5. FIG. 4 illustrates a flowchart of a process 400 of flushing cached pages according to embodiments of the present disclosure. FIG. 5 depicts a schematic diagram of adding and removing information related to at least part of volumes to and from recently used information.

Referring to FIG. 4, at 410, the recently used (RU) information is obtained. The cache can include volumes as shown in FIG. 3, and each volume includes a plurality of pages. The RU information indicates at least part of the volumes, and an unaccessed time length of the pages in the at least part of the volumes exceeds a threshold time length. The RU information can include the unaccessed time length of the at least part of the volumes and a number of cached pages in the volumes. In some embodiments, the RU information can be implemented as an aged volume list 510 as shown in FIG. 5. For example, as shown in FIG. 5, the cache includes volumes $300_1$, $300_2$ to $300_n$. The aged volume list 510 includes information related to the volumes $300_1$, $300_3$, $300_5$ and $300_7$. This means that the unaccessed time length of the four volumes (that is, the longest unaccessed time length of the cached pages in these volumes) exceeds a threshold time length.

The threshold time length can be a fixed time length, or can be determined by an access condition of pages in the cache. For example, in some embodiments, the threshold time length can be determined based on equation (1):

$$TL = GT * x \quad (1)$$

TL represents the threshold time length, GT represents the longest unaccessed time length of all of the cached pages in the cache, and x is a control factor. An initial value of x may be 0.9.

For ease of description, the total number of cached pages in the volumes involved in the RU information is indicated by totalAgedNumer, and the total number of the cached pages in the cache is indicated by totalNumber. For example, in the example as shown in FIG. 5, the total number of the cached pages in the volumes $300_1$, $300_3$, $300_5$ and $300_7$ is indicated by totalAgedNumer, and the total number of cached pages in the volumes $300_1$ to $300_n$ is indicated by totalNumber. If totalAgedNumer>totalNumber*0.7, the re-determined value of x is equal to the current value of x multiplied by 1.05. If totalAgedNumer<totalNumber*0.3, the re-determined value of x is equal to the current value of x multiplied by 0.95. The value of x is limited to a range of [0.5, 0.99].

It is to be noted that the manner of determining the threshold time length is only an example, which can be determined in other manners. The scope of the present disclosure is not limited in this aspect.

Referring back to FIG. 4, at 420, the number of pages flushed out of the cache from the at least part of the volumes is determined based on a total number of pages of the cache to be flushed and the RU information. As shown in FIG. 5, a cleaner thread is provided. After being waken up, the cleaner thread circulates the volumes $300_1$, $300_3$, $300_5$ and $300_7$, so as to check all the volumes involved in the aged volume list 510. For example, if the cleaner thread detects and determines that the unaccessed time length of the volume $300_1$ (that is, the longest unaccessed time length of the cached pages in the volume $300_1$) exceeds the current threshold time length, it is required to further determine a number of pages to be flushed out of the cache from the volume $300_1$.

In some embodiments, a number of pages to be flushed out of the cache from the volume can be determined based on a proportion of a number of cached pages in a certain volume in an aged volume list to a total number of cached pages in the aged volume list. For ease of description, the total number of the cached pages in the volume $300_1$ in FIG. 5 is indicated by P (thisVol), and the total number of the cached pages in all the volumes (i.e., volumes $300_1$, $300_3$, $300_5$ and $300_7$) involved in the aged volume list 510 is indicated by P (AgedVols). The total number of pages to be flushed out of the cache is indicated by N. When P (thisVol) is greater than P (AgedVols)/4, it can be determined that pages of a number of N/2 are to be flushed from the volume $300_1$; when P (thisVol) is greater than P (AgedVols)/8, it can be determined that pages of a number of N/4 are to be flushed from the volume $300_1$; and in other cases, it can be determined that pages of a number of N/8 are to be flushed from the volume $300_1$. The same rule is applicable to other volumes in the aged volume list 510. In this way, it is intended to flush the pages whose unaccessed time length is too long (that is, aged pages) from the volume at one time, which facilitates improving the efficiency of the cache further. It is to be noted that the manner of determining the number of pages to be flushed is only provided as an example.

Referring to FIG. 4, at 430, pages are flushed from the at least part of the volumes based on the determined number. For example, if at 420, it is determined that N/4 pages are flushed from the volume $300_1$, then, at 430, the cleaner thread selects N/4 pages from the volume $300_1$ and removes them from the cache. At this flush step, the respective number of pages can be flushed sequentially from the head of the LRU list as in a current implementation, or the respective number of pages can be flushed based on a most recently accessed time and an access frequency of the pages (see further description below with respect to the FIG. 9).

In some embodiments, the process 400 can further include steps 440 and 450. For example, after the pages in the volume $300_1$ are flushed at 430, the process proceeds to the step 440. At 440, after the flushing, it is determined whether the unaccessed time length of the pages in the volume $300_1$ is reduced below the threshold time length. If the unaccessed time length of the pages in the volume $300_1$ is reduced below the threshold time length, the process proceeds to 450. At 450, the information related to the volume $300_1$ is removed from the aged volume list 510, as indicated by an arrow 520 in FIG. 5. In this embodiment, the RU information is updated timely to enable the RU information to accurately reflect the current state of the cache, thereby flushing pages more accurately.

In some embodiments, the unaccessed time length of the cache pages in the volume can be detected periodically. In an embodiment in which a timer associated with the volume is provided, this act can be initiated by the timer periodically. If it is determined that there are pages whose unaccessed time length exceeding the threshold time length in the volume, information related to this volume can be added to the RU information. For example, in the example shown in FIG. 5, after it is determined that the unaccessed time length of the volume $300_2$ exceeds the threshold time length, the information related to the volume $300_2$ can be added to the aged volume list 510, as indicated by an arrow 530. Subsequent to the adding, the totalAgedNumer and the threshold time length TL can be updated. In the embodiment, the RU information is updated timely to enable the RU information to accurately reflect the current state of the cache, thereby flushing pages more accurately.

In the solution as proposed in the present disclosure, there is no MIN_PAGE, which indicates that stale pages can also be flushed out of the cache, thereby increasing available cache resources. Meanwhile, fairness among volumes can be maintained by controlling the number of pages flushed in each cycle. If there are two volumes both of which are candidates to be flushed, more pages are to be flushed from the volume having more cached pages.

In some embodiments, a plurality of pages in at least part of the volumes in the cache can be organized into a plurality of groups, and each group has a corresponding weight which is associated with a number of access times of pages in the respective group. Then, pages to be flushed are selected from a plurality of pages based on the recently accessed time of the plurality of pages and weights of the plurality of groups. A way of organizing a plurality of pages into a plurality of groups will be described by way of example with reference to FIGS. 6, 7, 8A and 8B.

Figure 6:
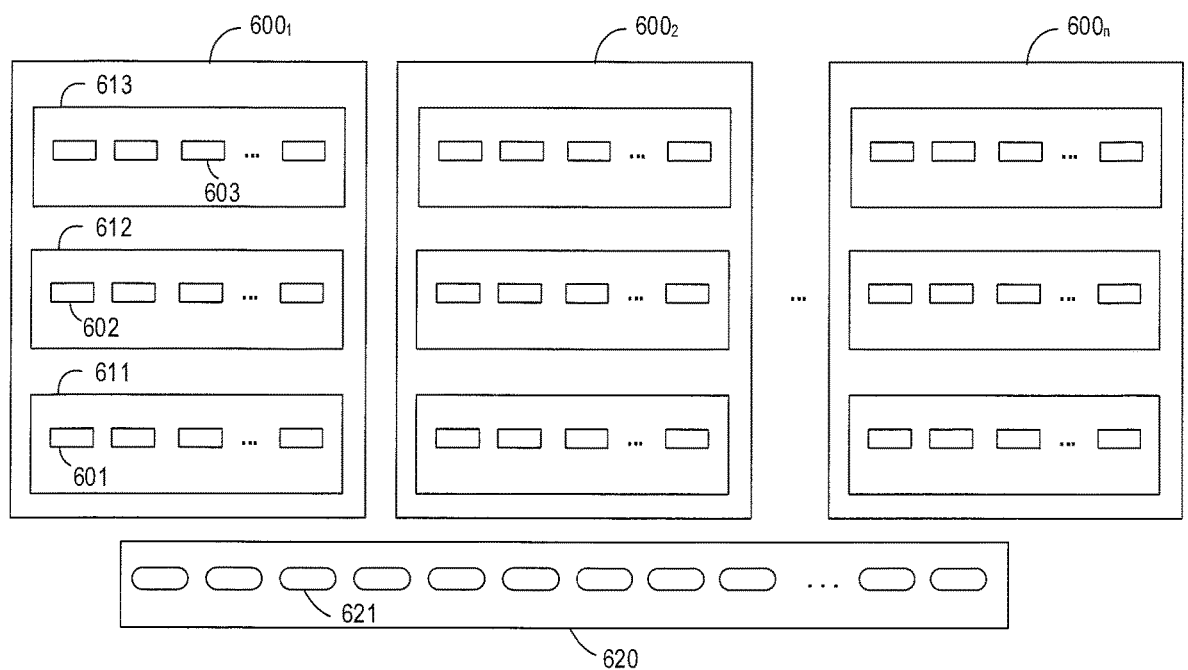
FIG. 6 illustrates a schematic diagram of a volume structure including a plurality of queues according to some embodiments of the present disclosure.

In some embodiments, a plurality of pages in the volume can be organized into a plurality of queues. FIG. 6 illustrates a schematic diagram of a volume structure with a plurality of queues according to some embodiments of the present disclosure. FIG. 6 shows volumes $600_1$, $600_2$ to $600_n$. Taking the volume $600_1$ as an example, the cached pages in the volume $600_1$ can be organized into three queues, that is, queues 611, 612 and 613, based on access frequency of the cached pages. For example, the cached pages 601, 602 and 603 in the volume $600_1$ are arranged in the queues 611, 612 and 613, respectively. In some embodiments, each queue can be linked as a double link list. A global history list 620 is provided for saving information related to both hit missed pages and pages flushed out of the cache.

Each queue is assigned with a queue weight. For example, the queue weights corresponding to the queues 611, 612 and 613 can be 1, 2 and 4, respectively. It is to be noted that 1, 2 and 4 are only provided as examples, and the queue weights are not limited to these values. In some embodiments, a different volume can have queue weights with a combination of different numerical values. In some embodiments, a length of the queue may not be fixed. For example, the length of the queue can depend on an I/O pattern of the volume. If the volume $600_1$ is hot enough and the hit rate of the cache is sufficiently high, most of the cached pages are probably included in 613. If the volume $600_1$ is hot but hit rate of the cache is low, most of the cached pages may be included in 601.

The cached page can have one or more of the following parameters: a most recently accessed time (which can be also referred to as a last access time), a queue number and a number of access times. The most recently accessed time indicates a time when the page is accessed most recently since a system is started. The queue number can indicate to which queue in a plurality of queues the page belongs. The number of access times is provided for recording a parameter of reference information of a cached page. This parameter is stored in a cached page metadata structure. When the cached page is accessed, the number of access times is incremented. When the cached page is flushed, information related to the flushed page is first moved to a global history list, and meanwhile, the number of access times thereof is saved in the global history list. The information related to the flushed page can also be referred to as a shadow element, such as 621 in FIG. 6. When the shadow page in the global history list 620 is accessed again, the number of access times recorded previously becomes valid, and the shadow page is placed in, for example, queues 611, 612 and 613 based on the access frequency. When a certain shadow page is removed from the global history list due to other new shadow pages, the shadow element of this page is removed from the global history list, and the number of access times becomes futile and stores in nowhere.

Figure 7:
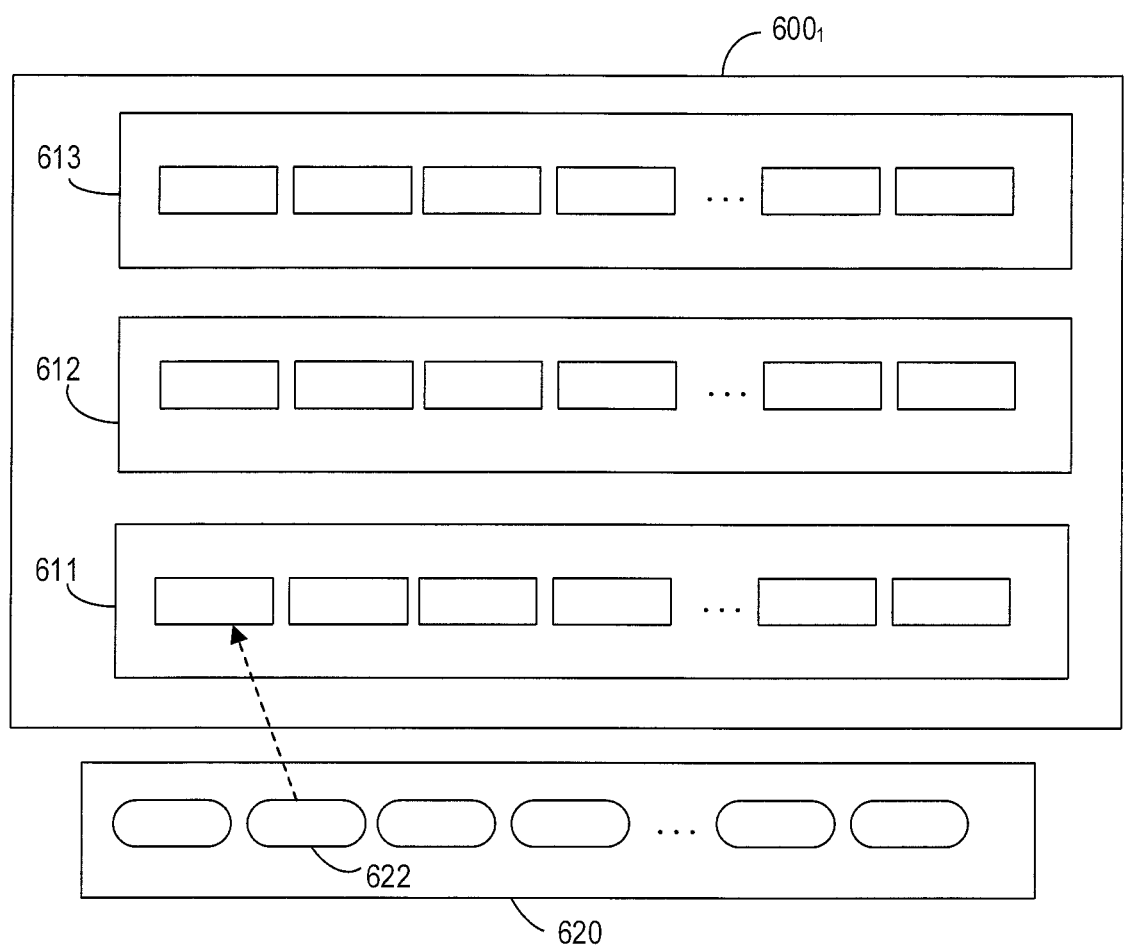
FIG. 7 depicts a schematic diagram of adding a shadow page to a cache.

FIG. 7 depicts a schematic diagram of adding a shadow page in the global history list 620 to the cache (that is, promoting a shadow page). When a promotion occurs, a candidate page is selected and removed from the global history list 620. An idle page is allocated, and user data corresponding to the shadow page is loaded to this idle page.

After loading data, this idle page is added to a queue and becomes a cached page. It is assumed that the shadow page is promoted as a cached page if its number of access times reaches 3. In the example as shown in FIG. 7, in response to the number of access times of the shadow page 622 reaching 3, this page is placed into the cache. For example, the page can be cached in the volume 600₁, and the information related to the page is added to, for example, the queue 611.

In some embodiments, the group to which the cached page belongs, for example in which queue of the plurality of queues it is placed, can be determined and adjusted based on the access frequency and the volume type. For example, in which queue the cached page is located can be determined and adjusted based on the number of access times and a weight of the volume type. Every time the cached page is hit, the number of access times is incremented. The weight of the volume type indicates that different types of pages should have different promotion weights. For example, for a volume created on redundant arrays of independent disks (RAID) group of serial attached small computer system interface (SAS) disks, the weight of the volume type of a page can be 1; and for a volume created on the RAID group of NL-SAS (Near Line-SAS) disks, the weight of the volume type of the page can be 2. The introduction of the weight of the volume type is to enable pages from a relatively slow disk to be cached longer as much as possible.

For a cached page, when the value of an equation (2) reaches a corresponding threshold value, the cached page can be promoted from a low priority queue, such as 611, to a high priority queue, such as 612:

$$\log_2((r-3)*vt) \qquad (2)$$

r represents a number of access times of a page, vt represents a weight of a volume type, and numeral 3 indicates that a threshold number of access times of the promoted page in the global history list is 3.

Figure 8A:
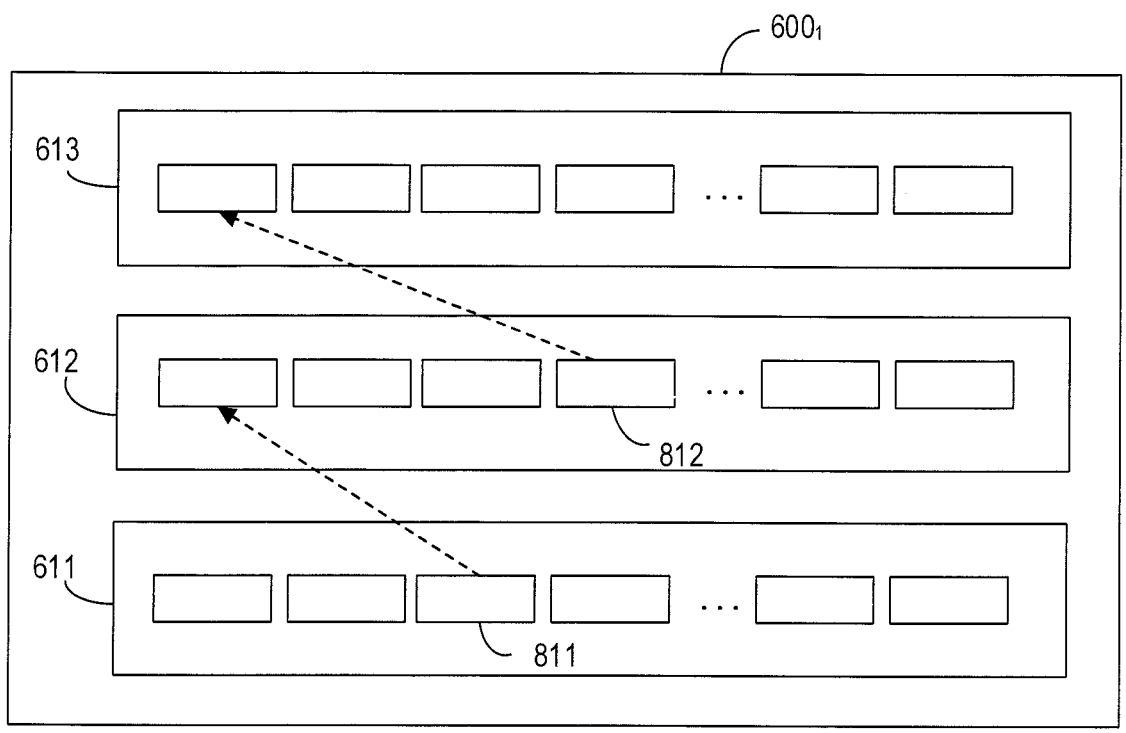
FIG. 8A depicts a schematic diagram of promoting a page from a SAS disk according to some embodiments of the present disclosure.
Figure 8B:
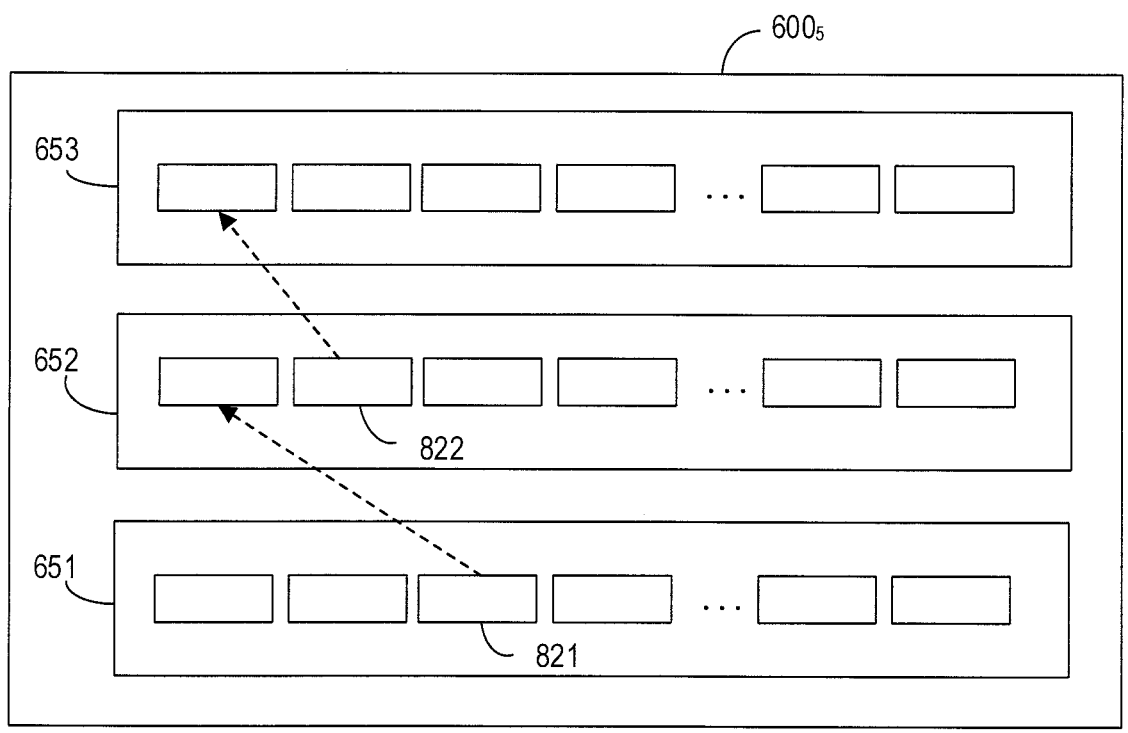
FIG. 8B depicts a schematic diagram of promoting a page from a NL-SAS disk according to some embodiments of the present disclosure.

FIG. 8A depicts a schematic diagram of promoting a page from a SAS disk according to some embodiments of the present disclosure. FIG. 8B depicts a schematic diagram of promoting a page from a NL-SAS disk according to some embodiments of the present disclosure. The volume 600₁ as shown in FIG. 8A is created on the SAS disk, and thus vt=1. For a cached page in FIG. 8A, when $\log_2(r-3)$ reaches a first threshold of 1, the cached page can be moved to the queue 612; and when it reaches a second threshold of 2, the cached page can be moved to the queue 613. For example, the number of access times of a page 811 reaches 5 and the value of equation (2) is 1, thus the page 811 can be promoted to the queue 612. Since the number of access times of a page 812 reaches 7 and the value of the equation (2) is 2, the page 812 can be promoted to the queue 613.

The volume 600₅ as shown in FIG. 8B is created on the NL-SAS disk having an access speed that is lower than that of the SAS disk, and thus vt=2. For a cached page in FIG. 8B, when $\log_2((r-3)*2)$ reaches the first threshold of 1, the cached page can be moved to the queue 652; and when it reaches the second threshold of 2, the cached page can be moved to 653. For example, since the number of access times of the page 821 reaches 4 and the value of the equation (2) is 1, the page 821 can be promoted to the queue 652. Since the number of access times of the page 822 reaches 5 and the value of the equation (2) is 2, the page 822 can be promoted to the queue 653. It is to be noted that the thresholds for the queues as depicted with reference to FIG. 8A and FIG. 8B are only provided examples, without any intention to make limitation.

As can be seen in the examples of FIGS. 8A and 8B, as compared with a cached page from a relatively fast disk, a cached page from a relatively slow disk can be promoted faster to a high priority queue and therefore can be cached longer. As such, the efficiency of the cache access can be further improved.

In some embodiments, pages to be flushed are selected from a plurality of pages based on the most recently accessed time of the plurality of pages and weights of the plurality of groups. For example, an actual unaccessed time length of each cached page in a volume can be determined using a current time and the most recently accessed time. Subsequently, a weighted unaccessed time length can be determined using the actual unaccessed time length and the weight of the group. A cached page having the longest weighted unaccessed time length acts as the longest unaccessed page, and will be flushed out of the cache. If there is still a need of flushing pages out from the volume, the above process can be repeated.

Figure 9:
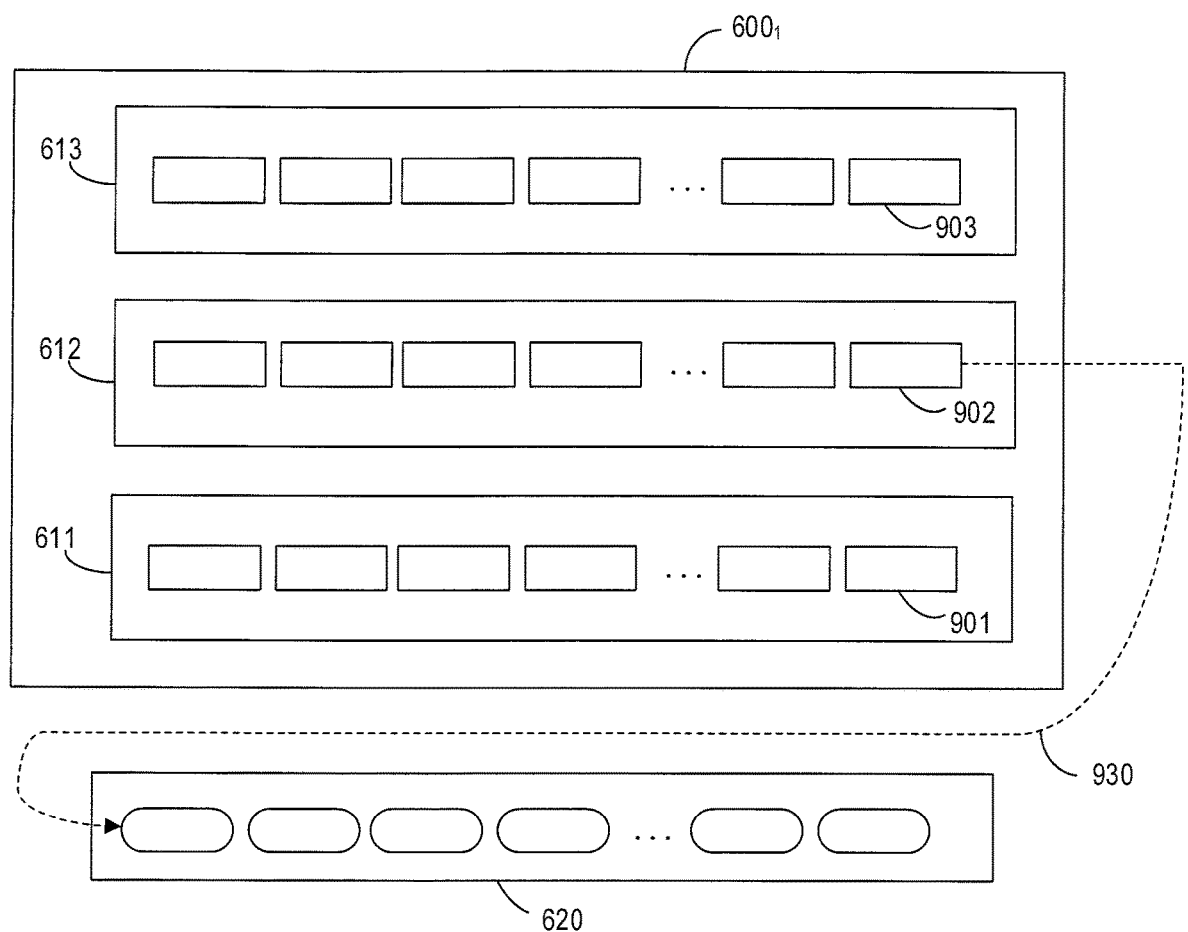
FIG. 9 schematically depicts a policy for selecting from a volume a page to be flushed according to some embodiments of the present disclosure.

FIG. 9 schematically depicts a policy of selecting from a volume a page to be flushed according to some embodiments of the present disclosure. In the example as shown in FIG. 9, in each queue, the cached pages in the volume 600₁ are ordered according to the most recently accessed time, and an element at the head of the queue indicates the page in the queue having the longest most recently accessed time from the current time point. Through equation (3), the longest unaccessed page is determined:

$$QNT = \frac{CT - LAT}{QW} \qquad (3)$$

QNT represents a weighted unaccessed time length, CT represents a current time, LAT represents the most recently accessed time of a cached page, QW represents a weight a queue of the cached page, and CT-LAT represents an actual unaccessed time length.

For cached pages 901, 902 and 903 at heads of the queues 611, 612 and 613 respectively, their actual unaccessed time length is 10, 32 and 60 (in which the unit is minute, for example), respectively. Based on the equation (3), obtained weighted unaccessed time lengths QNT is 10, 16 and 15, respectively. Hence, the cached page 902 is considered as the longest unaccessed page, and then flushed out of the cache. After the page 902 is flushed out of the cache, if there is still a page to be flushed, the process of determining the longest unaccessed page as mentioned above is repeated, and a re-determined longest unaccessed page is flushed out of the cache. In this embodiment, a page having high access frequency can be reserved longer in the cache, thereby facilitating improvement of the hit rate of cached page.

In some embodiments, a number of access times of a flushed page prior to flushing is saved, for example in a global history list. For example, the number of access times 6 of the page 902 prior to flushing is saved in the global history list 620, as indicated by a dotted arrow 930 in FIG. 9. However, if the most recently accessed time of the flushed page is earlier than the most recent time of the longest page in the global history list, the information of the page will not be saved in the global history list.

In some embodiments, related information is saved in a flushed page in a global history list, and its number of access times can be incremented if it is accessed again. If its number of access times exceeds a threshold number, the page can be re-arranged into the cache. In some cases, related information of the page is placed in a respective queue based on its number of access times.

Figure 10:
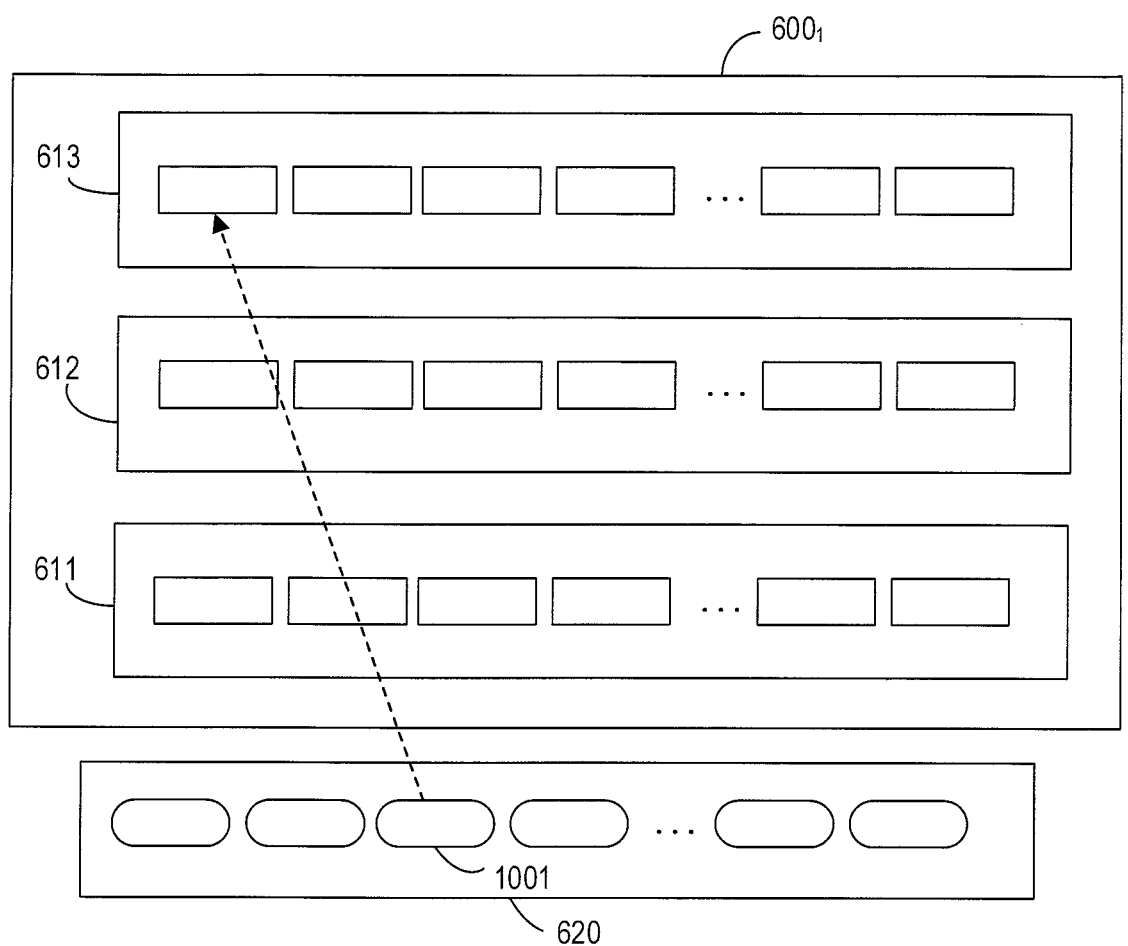
FIG. 10 depicts a schematic diagram of adding a shadow page to a high priority queue according to some embodiments of the present disclosure.

FIG. 10 depicts a schematic diagram of adding a shadow page to a high priority queue according to some embodiments of the present disclosure. In FIG. 10, a page 1001 in the global history list 620 may correspond to the page 902 in FIG. 9 which is flushed out of the cache. In response to the page 1001 being accessed, its number of access times is incremented and is increased to 7. As indicated above, the volume $600_1$ is created on the SAS disk. Hence, for the page 1001, the value of the equation (3) is equal to 2. Therefore, the page 1001 can be re-arranged into the cache, and information related to the page 1001 is directly arranged in the queue 613.

In the embodiments in which a plurality of pages are organized into a plurality of groups, as described above, a high frequency page can be cached longer than a low frequency page. In such kind of embodiment, the high frequency page can be moved to the high priority group, and pages in the high priority group can be reserved longer in the cache than those in the low priority group. The high frequency page is only flushed out of the cache after becoming cold for a long time. For example, for a high frequency page in the queue 613 (the weight of which is 4), it is reserved 4 times longer than the counterpart in the current implementation. Consequently, embodiments of the present disclosure can improve the hit rate of pages and thus increasing efficiency of responding of the data.

It should be noted that, although the method of flushing pages according to the present disclosure is described above with respect to an example of three queues, there may be any number of queues according to the embodiments of the present disclosure, and the weight of the queue is not limited to 1, 2 and 4 as indicated herein. Moreover, it would be understood by those skilled in the art that a configuration of managing a plurality of pages is not limited to queues, but intends to cover any configuration capable of grouping a plurality of pages.

Figure 11A:
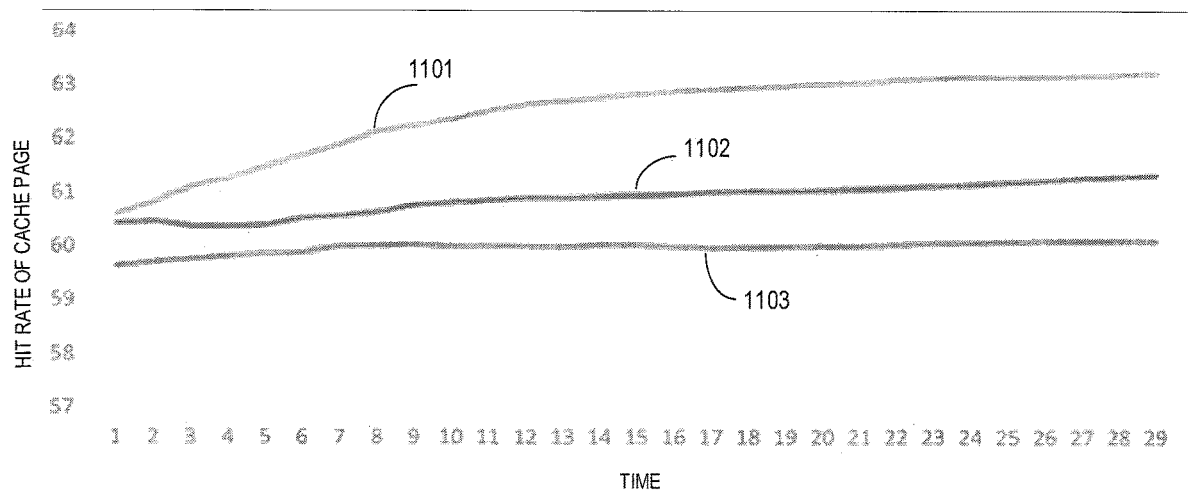
FIGS. 11A and 11B illustrate graphs of changes of a hit rate of cached pages and a number of promoted pages with time, respectively.
Figure 11B:
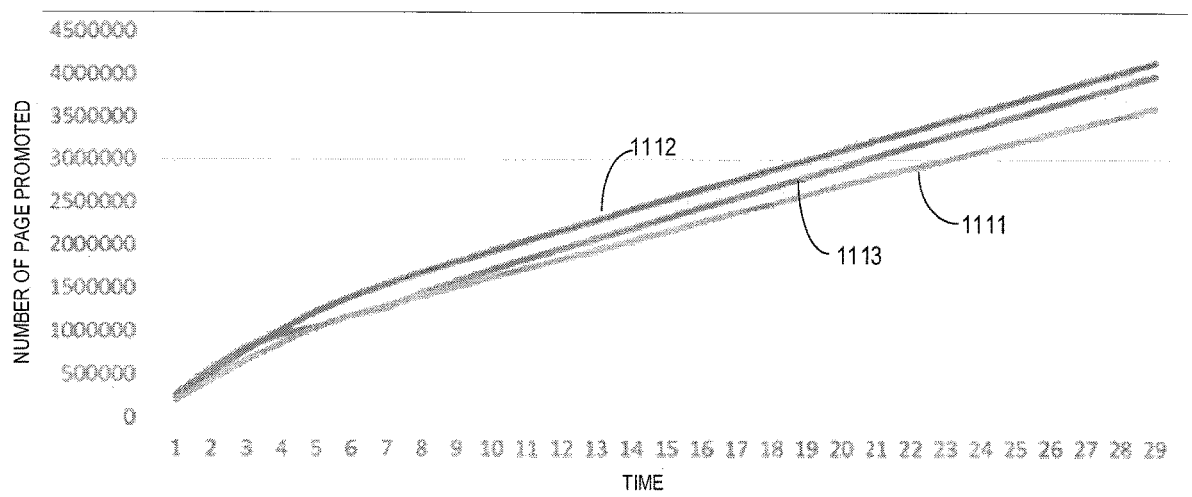

FIG. 11A and FIG. 11B are graphs of changes of hit rate of cached pages and the number of promoted pages with time, respectively. In FIGS. 11A and 11B, curves 1101 and 1111 correspond to the method of flushing pages as proposed in the present disclosure, in which a plurality of pages in each volume are organized into three queues as shown in FIG. 9. Curves 1102 and 1112 correspond to a conventional method of multiple queues, in which information of a flushed page is neither saved in a global history list nor includes RU information according to the embodiments of the present disclosure (for example, an aged volume list in FIG. 5). Curves 1103 and 1113 correspond to the LRU algorithm. It can be seen from FIGS. 11A and 11B that, utilizing the method proposed in the present disclosure, the hit rate of cached page is remarkably improved while the number of the promoted pages is decreased. Hence, the method proposed in the present disclosure can increase the cache efficiency, thereby improving the overall performance of a disk array accordingly.

Figure 12:
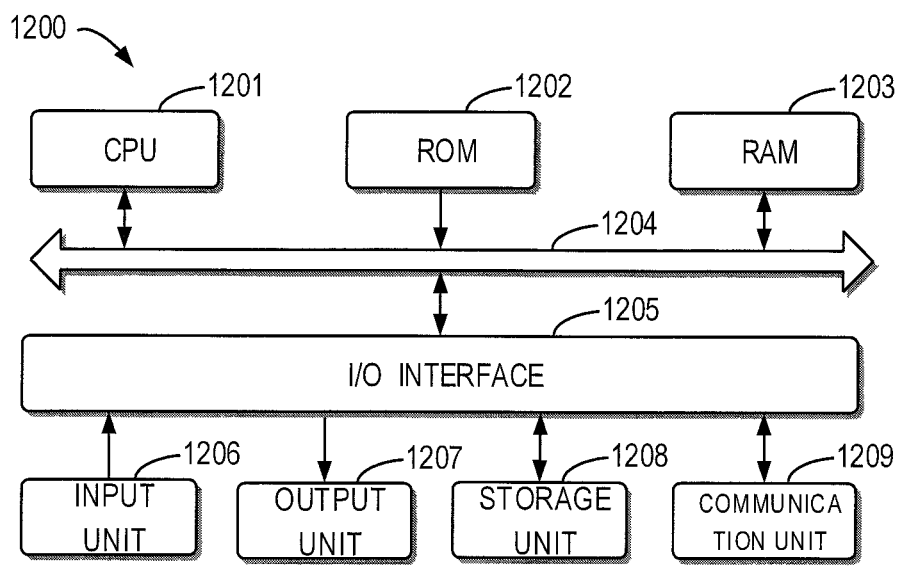
FIG. 12 illustrates a block diagram of an example device that can be used to implement embodiments of the present disclosure.

FIG. 12 illustrates a diagram of an example device 1200 that can implement embodiments of the present disclosure. As shown therein, the device 1200 includes a central processing unit (CPU) 1201 which performs various appropriate acts and processing, based on a computer program instruction stored in a read-only memory (ROM) 1202 or a computer program instruction loaded from a storage unit 1208 to a random access memory (RAM) 1203. The RAM 1203 stores therein various programs and data required for operations of the device 1200. The CPU 1201, the ROM 1202 and the RAM 1203 are connected via a bus 1204 with one another. An input/output (I/O) interface 1205 is also connected to the bus 1204.

The following components in the device 1200 are connected to the I/O interface 1205: an input unit 1206, e.g. a keyboard, a mouse and the like; an output unit 1207 including various kinds of displays and a loudspeaker, etc.; a storage unit 1208 including a magnetic disk, an optical disk, and etc.; a communication unit 1209 including a network card, a modem, and a wireless communication transceiver, etc. The communication unit 1209 allows the device 1200 to exchange information/data with other devices through a computer network such as Internet and/or various kinds of telecommunications networks.

Various processes and processing described above, e.g., the process 400, may be executed by the processing unit 1201. For example, in some embodiments, the process 400 may be implemented as a computer software program or a computer program product that is tangibly included in a machine readable medium, e.g., the storage unit 1208. In some embodiments, part or all of the computer programs may be loaded and/or mounted onto the device 1200 via the ROM 1202 and/or the communication unit 1209. When the computer program is loaded to the RAM 1203 and executed by the CPU 1201, one or more steps of the process 400 as described above may be executed. Alternatively, in some other embodiments, the CPU 1201 can be configured to perform the process 400 in any other appropriate manner (for example, by means of firmware).

According to some embodiments of the present disclosure, there is provided a computer readable medium, on which a computer program is stored, and the program is caused to implement the method according to the present disclosure when executed.

Those skilled in the art would appreciate that the steps of the method described herein may be each implemented through a general computing device, they may be integrated in a single computing device or distributed over a network consisting of a plurality of computing devices, alternatively, they may be implemented through computing device-executable program code such that they are stored in a storage device and executed by a computing device, or they are respectively produced as an integrated circuit, or multiple modules or steps therein are produced as a single integrated circuit module for implementation. As such, the present disclosure is not limited to any specific combination of hardware and software.

It will be noted that, although several units or sub-units of the device have been mentioned in the above detailed description; such partitioning is only by way of example but not provided for limitation. In practice, according to the embodiments of the present disclosure, the features and functions of two or more units described above may be embodied in one unit. In turn, the features and functions of one unit described above may be further embodied in more units.

The above are merely optional embodiments of the present disclosure and not intended for limiting the present disclosure, and for those skilled in the art, various modifications and changes are allowed in the present disclosure. Within the spirits and principles of the present disclosure, any modification, equivalent replacement, improvement, etc. shall all be covered in the protection scope of the present disclosure.

We claim:

1. A method of storage management, comprising:
obtaining recently used (RU) information of a cache, the cache including volumes, each of the volumes including a plurality of pages, the RU information indicating at least part of the volumes, and an unaccessed time length of pages in the at least part of the volumes exceeding a threshold time length;
determining, based on a total number of pages to be flushed out of the cache and the RU information, a number of pages to be flushed out of the cache from the at least part of the volumes;
flushing, based on the determined number, pages in the at least part of the volumes;
determining the unaccessed time length of pages in a second volume of the cache; and
in response to the determined unaccessed time length exceeding the threshold time length,
adding information related to the second volume to the RU information, and
updating the threshold time length.

2. The method of claim 1, further comprising:
after the flushing, in response to unaccessed time length of pages in a first volume of the at least part of the volumes being reduced below the threshold time length, removing information related to the first volume from the RU information.

3. The method of claim 1, wherein determining the number of pages to be flushed out of the cache from the at least part of the volumes comprises:
determining a proportion of a number of pages cached in a third volume of the at least part of the volumes to a total number of pages cached in the at least part of the volumes; and
determining, based on the proportion and the total number of pages to be flushed out of the cache, a number of pages to be flushed out of the cache from the third volume.

4. The method of claim 1, wherein the at least part of the volumes further comprise a fourth volume, and wherein flushing the fourth volume comprises:
organizing the plurality of pages of the fourth volume into a plurality of groups, each of the plurality of groups having a respective weight, the weight being associated with a number of times for which pages in the respective group are accessed; and
selecting, from the plurality of pages, a page to be flushed, based on a most recently accessed time of the plurality of pages and the weights of the plurality of groups.

5. The method of claim 1, wherein a first page in the cache is flushed out of the cache, the method further comprising:
saving a number of access times of the first page prior to the flushing.

6. The method of claim 5, further comprising:
in response to the first page being accessed, incrementing the number of access times; and
in response to the number of access times of the first page exceeding a threshold number, re-arranging the first page into the cache.

7. An electronic device, comprising:
a processor; and
a memory coupled to the processor and storing instructions therein, the instructions, when executed by the processor, causing the device to execute acts, the acts comprising:
obtaining recently used (RU) information of a cache, the cache including volumes, each of the volumes including a plurality of pages, the RU information indicating at least part of the volumes, and an unaccessed time length of pages in the at least part of the volumes exceeding a threshold time length;
determining, based on a total number of pages to be flushed out of the cache and the RU information, a number of pages to be flushed out of the cache from the at least part of the volumes;
flushing, based on the determined number, pages in the at least part of the volumes;
determining the unaccessed time length of pages in a second volume of the cache; and
in response to the determined the unaccessed time length exceeding the threshold time length,
adding information related to the second volume to the RU information, and
updating the threshold time length.

8. The device of claim 7, wherein the acts further comprise:
after the flushing, in response to the unaccessed time length of pages in a first volume of the at least part of the volumes being reduced below the threshold time length, removing information related to the first volume from the RU information.

9. The device of claim 7, wherein determining the number of pages to be flushed out of the cache from the at least part of the volumes comprises:
determining a proportion of a number of pages cached in a third volume of the at least part of the volumes to a total number of pages cached in the at least part of the volumes; and
determining, based on the proportion and the total number of pages to be flushed out of the cache, a number of pages to be flushed out of the cache from the third volume.

10. The device of claim 7, wherein the at least part of the volumes further comprise a fourth volume, and wherein flushing the fourth volume comprises:
organizing the plurality of pages of the fourth volume into a plurality of groups, each of the plurality of groups having a respective weight, the weight being associated with a number of times for which pages in the respective group are accessed; and
selecting, from the plurality of pages, a page to be flushed, based on a most recently accessed time of the plurality of pages and the weights of the plurality of groups.

11. The device of claim 7, wherein a first page in the cache is flushed out of the cache, the acts further comprising:
saving a number of access times of the first page prior to the flushing.

12. The device of claim 11, further comprising:
in response to the first page being accessed, incrementing the number of access times; and
in response to the number of access times of the first page exceeding a threshold number, re-arranging the first page into the cache.

13. A computer program product having a non-transitory computer readable medium that stores a set of instructions to perform storage management; the set of instructions, when carried out by computerized circuitry, causing the computerized circuitry to perform a method of:
obtaining recently used (RU) information of a cache, the cache including volumes, each of the volumes including a plurality of pages, the RU information indicating at least part of the volumes, and an unaccessed time length of pages in the at least part of the volumes exceeding a threshold time length;

determining, based on a total number of pages to be flushed out of the cache and the RU information, a number of pages to be flushed out of the cache from the at least part of the volumes;

flushing, based on the determined number, pages in the at least part of the volumes;

determining the unaccessed time length of pages in a second volume of the cache; and in response to the determined unaccessed time length exceeding the threshold time length,
  adding information related to the second volume to the RU information, and
  updating the threshold time length.

14. The method of claim 1, wherein storage system circuitry caches data in the cache in response to access requests provided by a set of external devices; and
  wherein flushing the pages in the at least part of the volumes includes:
    removing a first set of pages from the cache while leaving a second set of pages in the cache, the storage system circuitry providing an access frequency for the second set of pages that is higher than an access frequency for the first set of pages.

15. The device of claim 7, wherein the processor caches data in the cache in response to access requests provided by a set of external devices; and
  wherein flushing the pages in the at least part of the volumes includes:
    removing a first set of pages from the cache while leaving a second set of pages in the cache, the processor providing an access frequency for the second set of pages that is higher than an access frequency for the first set of pages.

16. The computer program product of claim 13 wherein the computerized circuitry caches data in the cache in response to access requests provided by a set of external devices; and
  wherein flushing the pages in the at least part of the volumes includes:
    removing a first set of pages from the cache while leaving a second set of pages in the cache, the computerized circuitry providing an access frequency for the second set of pages that is higher than an access frequency for the first set of pages.

17. A method of storage management, comprising:
  obtaining recently used (RU) information of a cache, the cache including volumes, each of the volumes including a plurality of pages, the RU information indicating at least part of the volumes, and an unaccessed time length of pages in the at least part of the volumes exceeding a threshold time length;
  determining, based on a total number of pages to be flushed out of the cache and the RU information, a number of pages to be flushed out of the cache from the at least part of the volumes;
  flushing, based on the determined number, pages in the at least part of the volumes;
  wherein determining the number of pages to be flushed out of the cache from the at least part of the volumes comprises:
    determining a proportion of a number of pages cached in a third volume of the at least part of the volumes to a total number of pages cached in the at least part of the volumes; and
    determining, based on the proportion and the total number of pages to be flushed out of the cache, a number of pages to be flushed out of the cache from the third volume.

18. The method of claim 17, wherein storage system circuitry caches data in the cache in response to access requests provided by a set of external devices; and
  wherein flushing the pages in the at least part of the volumes includes:
    removing a first set of pages from the cache while leaving a second set of pages in the cache, the storage system circuitry providing an access frequency for the second set of pages that is higher than an access frequency for the first set of pages.

19. An electronic device, comprising:
  a processor; and
  a memory coupled to the processor and storing instructions therein, the instructions, when executed by the processor, causing the device to execute acts, the acts comprising:
    obtaining recently used (RU) information of a cache, the cache including volumes, each of the volumes including a plurality of pages, the RU information indicating at least part of the volumes, and an unaccessed time length of pages in the at least part of the volumes exceeding a threshold time length;
    determining, based on a total number of pages to be flushed out of the cache and the RU information, a number of pages to be flushed out of the cache from the at least part of the volumes;
    flushing, based on the determined number, pages in the at least part of the volumes;
  wherein determining the number of pages to be flushed out of the cache from the at least part of the volumes comprises:
    determining a proportion of a number of pages cached in a third volume of the at least part of the volumes to a total number of pages cached in the at least part of the volumes; and
    determining, based on the proportion and the total number of pages to be flushed out of the cache, a number of pages to be flushed out of the cache from the third volume.

20. The device of claim 19, wherein the processor caches data in the cache in response to access requests provided by a set of external devices; and
  wherein flushing the pages in the at least part of the volumes includes:
    removing a first set of pages from the cache while leaving a second set of pages in the cache, the processor providing an access frequency for the second set of pages that is higher than an access frequency for the first set of pages.

21. A computer program product having a non-transitory computer readable medium that stores a set of instructions to perform storage management; the set of instructions, when carried out by computerized circuitry, causing the computerized circuitry to perform a method of:
  obtaining recently used (RU) information of a cache, the cache including volumes, each of the volumes including a plurality of pages, the RU information indicating at least part of the volumes, and an unaccessed time length of pages in the at least part of the volumes exceeding a threshold time length;
  determining, based on a total number of pages to be flushed out of the cache and the RU information, a number of pages to be flushed out of the cache from the at least part of the volumes;

flushing, based on the determined number, pages in the at least part of the volumes;

wherein determining the number of pages to be flushed out of the cache from the at least part of the volumes comprises:

determining a proportion of a number of pages cached in a third volume of the at least part of the volumes to a total number of pages cached in the at least part of the volumes; and determining, based on the proportion and the total number of pages to be flushed out of the cache, a number of pages to be flushed out of the cache from the third volume.

22. The computer program product of claim 21, wherein the computerized circuitry caches data in the cache in response to access requests provided by a set of external devices; and wherein flushing the pages in the at least part of the volumes includes:

removing a first set of pages from the cache while leaving a second set of pages in the cache, the computerized circuitry providing an access frequency for the second set of pages that is higher than an access frequency for the first set of pages.

* * * * *